US009300411B1

United States Patent
Dehnie et al.

(10) Patent No.: US 9,300,411 B1
(45) Date of Patent: Mar. 29, 2016

(54) HYBRID SIGNAL DETECTION FOR DYNAMIC SPECTRUM ACCESS

(71) Applicant: The United States of America, as represented by the Secretary of the Air Force, Washington, DC (US)

(72) Inventors: Sintayehu Dehnie, Bexely, OH (US); Vasu Chakravarthy, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/684,598

(22) Filed: Apr. 13, 2015

(51) Int. Cl.
*H04L 27/06* (2006.01)
*H04B 17/20* (2015.01)
*H04B 1/00* (2006.01)
*H04W 16/14* (2009.01)

(52) U.S. Cl.
CPC .............. *H04B 17/20* (2015.01); *H04B 1/0014* (2013.01); *H04W 16/14* (2013.01)

(58) Field of Classification Search
CPC ..... H04W 16/14; H04L 27/0006; H04B 1/00; H04B 17/20; H04B 17/26; H04B 1/0003
USPC .......... 375/342, 260, 349; 702/179, 182, 181, 702/72, 75; 455/161.2, 161.1, 168.1
See application file for complete search history.

(56) References Cited

U.S. PATENT DOCUMENTS

| | | | |
|---|---|---|---|
| 6,448,921 B1 | 9/2002 | Tsui et al. | |
| 8,140,017 B2 | 3/2012 | Shi et al. | |
| 8,184,653 B2 | 5/2012 | Dain et al. | |
| 8,346,176 B2 | 1/2013 | Xin et al. | |
| 8,538,424 B2 | 9/2013 | Xin et al. | |
| 8,761,677 B2 | 6/2014 | Kim et al. | |
| 8,922,427 B2 | 12/2014 | Dehnie et al. | |
| 2010/0081387 A1 | 4/2010 | Shi et al. | |
| 2011/0086602 A1* | 4/2011 | Xin ........................ | H04B 17/16 455/161.2 |

OTHER PUBLICATIONS

Edwin Banta, "Energy Detection of Unknown Deterministic Signals in the Presence of Jamming," IEEE Transactions on Aerospace and Electronic Systems, vol. AES-14, No. 2 (Mar. 1978).
Jeffrey Boksiner et al., "Comparision of Energy Detection using Averaging and Maximum Values Detection for Dynamic Spectrum Access," Sarnoff Symposium, 2011 34th IEEE (May 3-4, 2011).

(Continued)

*Primary Examiner* — Rahel Guarino
(74) *Attorney, Agent, or Firm* — AFMCLO/JAZ; Jason Sopko (57) ABSTRACT

An adaptive signal detector to detect a signal in a spectrum space includes a software defined receiver for calculating a cumulative decision statistic for determining the presence of the signal in the spectrum space. The cumulative decision statistic is determined by a sequential energy detector that includes a block energy detector that has a block termination rule, a block sampling instant and a block decision phase. A truncated sequential energy detector has a truncated sequential termination rule and a truncated sequential decision phase. The block energy detector and truncated sequential energy detector are interoperated to provide the cumulative decision statistic in which the block energy sampling instants provide samples that are independent and identically distributed. The cumulative decision statistic determines the presence of the signal in the spectrum space based upon a non-Bayesian dynamic mathematical modeled relationship of the cumulative decision statistic.

7 Claims, 5 Drawing Sheets

(56) References Cited

OTHER PUBLICATIONS

Jia-Qi Duan et al., "Compressive Spectrum Sensing in Centralized Vehicular Cognitive Radio Networks," International Journal of Future Generation Communication and Networking, vol. 6, No. 3 (Jun. 2013).
R. Gill et al., Comparative Analysis of the Spectrum Sensing Techniques Energy Detection and Cyclostationary Feature Detection,"International Journal of Advanced Research in Electrical, Electronics and Instrumentation Engineering," vol. 3, Issue 7 (Jul. 2014).
Steven Kay, "Adaptive Detection for Unknown Noise Power Spectral Densities," IEEE Transactions on Signal Processing, vol. 47, No. 1 (Jan. 1999).
Kyungtae Kim et al., "Energy Detection Based Spectrum Sensing for Cognitive Radio: An Experimental Study," IEEE Globecom 2010 Proceedings (2010).
V. I. Kostylev, "Probability of the Energy Detection of a Signal with Random Amplitude," 9th Telecommunications Forum, Belgrade, Yugoslavia (Nov. 20-22, 2001).
V. I. Kostylev, "Energy Detection of a Signal with Random Amplitude," IEEE International Conference on Communications, vol. 3 (2002).
Nikhil Kundargi, et al., "A Performance Study of Novel Sequential Energy Detection Methods for Spectrum Sensing," 2010 IEEE International Conference on Acoustics Speed and Signal Processing (Mar. 1419, 2010).
Lifeng Lai et al., "Quickest Detection in Cognitive Radio: A Sequential Change Detection Framework," IEEE Globecom 2008 Proceedings (2008).
Husheng Li et al., "Detection of Cognitive Interference in Wireless Environments: An IQ Test in the Air," 2013 IEEE Military Communications Conference (2013).
Lu Lu et al., "Optimal Sequential Detection in Cognitive Radio Networks," 2012 IEEE Wireless Communications and Networking Conference: PHY and Fundamentals (2012).
Xiao Ma, "Spectrum Sensing Based on Sequential Testing," M.S. Thesis, University of Canterbury, Christchurch, New Zealand (Dec. 2009).

Mark R. Morelande et al., "Detection of a Random Amplitude Modulation in Polynomial Phase Signals," Conference Record of the Thirty-Third Asilomar Conference on Signals, Systems, and Computers (Oct. 24-27, 1999).
Dominique Noguet, "Sensing Techniques for Cognitive Radio—State of the Art and Trends—A White Paper," IEEE SCC41 (Apr. 2009).
Mansi Subhedar et al., "Spectrum Sensing Techniques in Cognitive Radio Networks: A Survey," International Journal of Next-Generation Networks (IJNGN), vol. 3, No. 2 (Jun. 2011).
Kefeng Tan et al., "RECOG: A Sensing-based Cognitive Radio System with Real-Time Application Support," Draft for IEEE Journal on Selected Areas in Communications: Cognitive Radio Series (2013).
Harry Urkowitz, "Energy Detection of Unknown Deterministic Signals," Proceedings of the IEEE, vol. 55, No. 4 (Apr. 1967).
Harry Urkowitz, "Energy Detection of a Random Process in Colored Gaussian Noise," IEEE Transactions on Aerospace and Electronic Systems, vol. AES-5, No. 2 (Mar. 1969).
L. Vergara et al., "Detection of Signals of Unknown Duration by Multiple Energy Detectors," Signal Processing 90 (2010).
Xiongwei Xie et al., "Detecting Primary User Emulation Attacks in Cognitive Radio Networks via Physical Layer Network Coding," 2013 International Workshop on Communications and Sensor Networks (ComSense-2013) (2013).
Yan Xin et al., "A Simple Sequential Spectrum Sensing Scheme for Cognitive Radio," IEEE Transactions on Signal Processing (Submitted Draft) (May 28, 2009).
Yan Xin et al., "B-SSCT: A Block Sequential Spectrum Sensing Scheme for Cognitive Radio," 2011 6th International ICST Conference on Cognitive Radio Oriented Wireless Networks and Communications (CROWNCOM) (2011).
Yan Xin et al., "SCCT: A Simple Sequential Spectrum Sensing Scheme for Cognitive Radio," IEEE "Globecom" 2009 Proceedings (2009).
Yan Xin et al., "A Low-Complexity Sequential Spectrum Sensing Scheme for Cognitive Radio (Draft)" Submitted for publication in IEEE Journal on Selected Areas in Communications (Oct. 29, 2012).
Xiong Zhang et al., "A Sequential Energy Detection Based Spectrum Sensing Scheme in Cognitive Radio," Research Journal of Applied Sciences, Engineering and Technology, vol. 5, No. 3 (2013).
Ning Zhang et al., "Risk-Aware Cooperative Spectrum Access for Multi-Channel Cognitive Radio Networks," IEEE Journal on Selected Areas in Communications, Vo. 32, No. 3 (Mar. 2014).

* cited by examiner

Prior Art

HYBRID SIGNAL DETECTION FOR DYNAMIC SPECTRUM ACCESS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to cognitive radios, as implemented in software defined receivers, and more specifically to a new hybrid signal detection system and method for dynamic spectrum access.

Radio frequency spectrum space is typically allocated by government agencies by license, with licensees being allocated a fixed frequency band for their exclusive use, whether or not those frequency bands are being used at all times.

With each modern new use for spectrum space, there is an increased demand for increasingly unavailable spectrum space.

Dynamic spectrum access (DSA) promises a solution to this spectrum allocation problem by spectrum sharing. Spectrum sharing potentially allows unlicensed users, called Secondary Users (SUs), to opportunistically access unoccupied/under-utilized spectrum licensed to incumbent users, called Primary Users (PUs). Dynamic spectrum sharing can alleviate the problem of inefficient spectrum utilization and scarcity.

Proposed dynamic spectrum access technologies will use so-called cognitive radios.

A cognitive radio is an "intelligent" radio that can be programmed and dynamically configured to detect available channels in wireless spectrum, and change its transmission and reception parameters to allow more concurrent wireless communications in a given spectrum or frequency band at a location.

The goal of a cognitive radio is being met by the development of software defined radios.

Figure 1:
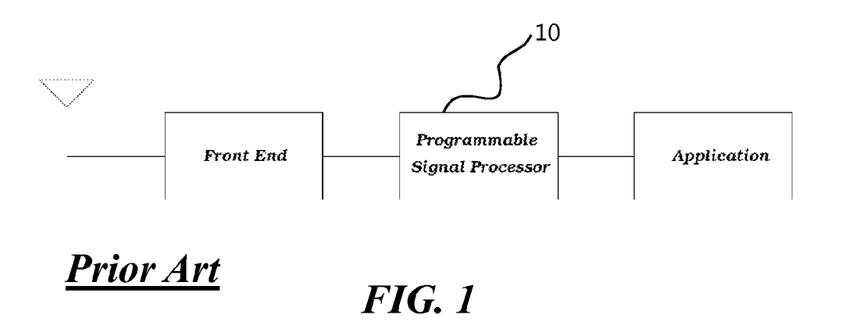
FIG. 1 shows a typical prior art software defined receiver architecture, in which the programmable signal processor can be implemented in FPGA, SSP or GPP.

A software defined radio, instead of all the individual components of a typical analog, or even partly digital, radio transmitter or receiver, attempts to place all or most of the complex signal handling into a modern digital format. In its simplest form, a software defined radio comprises an antenna connected to an analog-to-digital converter chip connected to conventional computer circuitry so that all the filtering and signal detection can take place in the digital domain. FIG. 1 shows a typical prior art software defined receiver architecture, in which a programmable signal processor 10 can be implemented in field programmable gate arrays (FPGA), digital signal processors (DSP) and even in general purpose processors (GPP).

The key enabling technology for dynamic spectrum access to work, as implemented in software defined radios, is spectrum sensing.

Spectrum sensing, or signal detection, determines the presence or absence of spectrum holes for opportunistic access. That is, Secondary Users are granted, or simply take, access to spectrum after it is determined that no Primary User activity is detected in a frequency band of interest. In addition to identifying spectrum holes, a sensing function provides interference protection to PUs by preventing, or discouraging, SUs from accessing the spectrum or frequency band while a PU is actively using it.

While various signal processing techniques have been proposed in the prior art for spectrum sensing, energy based sensing is commonly used for its simplicity and ease of practical implementation. Two commonly used energy detectors schemes are block energy detection and sequential energy detection.

Block energy detectors determine the presence or absence of signals of interest by processing a block, that is, a large sample size taken from a spectrum space, or frequency band, estimating the signal energy present in that spectrum space and making a yes-no decision on whether there is a PU signal present or an available spectrum hole based on the idea that sufficiently high energy indicates that there must be a Primary User (PU) signal over and above the noise, and a sufficiently low signal energy indicates that there must be only noise and thus a "spectrum hole." Sample size is a function of sampling duration and bandwidth of the sampling function. In general, a block energy detector is characterized by a fixed detection delay since the sensing duration and bandwidth are usually fixed parameters. Therefore, block energy detection can provide reliable sensing at a fixed detection delay. In a congested spectrum environment where spectrum availability is highly dynamic, it is crucial to not only reliably detect presence of spectrum holes, but also quickly. As the sample size, a resulting delay parameter is set to a fixed value, block based energy detection is not suitable for most practical DSA systems.

Sequential energy detectors determine the presence or absence of signals of interest by processing a single, or very small, sample and making a yes-no-unknown decision. If the single sample size results in neither a clear yes or no, another sample is collected and processed until a yes or no decision can be made. Generally, sequential energy detectors provide the quickest reliable detection while providing bounded false alarm (FA) and missed detection (MD) probabilities. Quickest detection means that a sequential energy detector requires a reduced number of samples (on average) to yield performance comparable to a block energy detector. The term detection delay refers to the number of samples required to provide reliable detection.

In a theoretical setting, a sequential detector continues to take additional samples until a reliable decision is made. That is, the sequential detector terminates if and only if a decision is made, not only increasing detection time, but also unpredictably increasing detection time.

The prior art is replete with statistical approaches for making determinations based on decision statistics such as the estimated signal energy in a set of samples collected from a spectrum space. The sequential probability ratio test (SPRT), introduced in the 1940s in Abraham Wald, *Sequential Analysis*, John Wiley and Sons, Inc. (1947), for example, has been proposed for use for cognitive radios. SPRT, however, despite its wide use in many scientific and engineering fields, and that for given detection error probabilities, generally requires the smallest average number of samples for a given detection performance, introduces computational complexities from requiring computation of likelihood ratios, which are difficult to implement in a cognitive radio and, under conditions likely to arise in spectrum sensing, can actually increase error probabilities.

There is, therefore, a need for faster and more reliable spectrum sensing systems and methods to successfully enable dynamic spectrum access as implemented in cognitive radio, software defined radios or any other system where spectrum sensing is required. Such new spectrum sensing systems and methods must be computationally efficient and able to be efficiently implemented in existing digital signal processing hardware.

There is an additional need for spectrum sensing systems and methods that are easily adaptable and reconfigurable as needed for different dynamic spectrum access purposes.

SUMMARY OF THE INVENTION

To address this challenge, the teachings of the present invention provide a new hybrid signal detector that quickly and reliably discerns the presence of signals of interest using hybrid block and truncated sequential energy detection.

Instead of, as in block energy detection, collecting and processing a block of many samples in a single sequential stage and making a final decision, or as in sequential energy detection, sequentially collecting and processing a single sample in multiple stages and making a final decision only after a reliable decision can be made after a later stage, the present invention sequentially collects and processes a block of multiple samples and includes all old and new collected samples for purposes of making a decision, decreasing the number of sequential stages needed. If a determination has not been made after a number of sequential stages, the process is terminated with a final block energy detection using all samples.

The new hybrid block and truncated sequential energy detector is not a mere combination of block and truncated sequential energy detection, but an interoperating of the two prior art approaches resulting in a truly synergistic more than the sum of its parts result.

The new hybrid block and truncated sequential energy detector includes, in one example embodiment, a new cumulative decision statistic that removes the bias that would otherwise result from the monotonic increase in a simple decision statistic from adding more and more samples by subtracting a correction factor calculated as the number of sequential stages times the total number of samples taken over all stages.

The present invention includes a hybrid detector where each stage is characterized by a sampling instant and a decision phase. At the beginning of each stage, a block of samples is collected, the detector computes a cumulative decision statistic using all samples collected in previous stages and attempts to make a decision as to whether spectrum is available or a reliable decision cannot be made.

The detector first determines whether spectrum is available or a reliable decision cannot be made at an initial stage. If a reliable decision is made, the detector terminates. Otherwise, it moves to a next stage where it takes an additional block of samples. The hybrid detector is a block energy detector (BED) within a stage since the decision is based on the energy content of a block of samples. Across stages, the detector is a sequential energy detector (SED) as the detector moves to the next stage to take additional samples and attempts to make a decision. SED is different from prior art sequential probability ratio tests (SPRT) because it does not require sequential computations of likelihood ratios, which in-turn involves computation of the probability density estimation.

The hybrid signal detector has multiple input parameters that can be independently controlled to support various application environments and their performance requirements. The capability to support different performance requirements renders the hybrid detector adaptive to various application environments. Therefore, such an adaptive detector is implemented in a software defined receiver where it is added as a software module within a signal processing block of the receiver.

The present invention additionally includes calculating False Alarm (FA) and Missed Detection probabilities of a detector according to the teachings of the present invention using the probability distribution of separate sequential stages.

Other advantages of the teachings of the present invention include that it permits using smaller block sample sizes in each block energy detection stage than in prior art block energy detectors, where a large sample size is necessary to help ensure a reliable decision, at the cost of a fixed, but longer, detection delay. Sequential smaller block sample sizes can provide even greater reliability with shorter detection delays.

BRIEF DESCRIPTION OF THE DRAWINGS

The teachings of the present invention will be better understood from the accompanying drawings illustrating various aspects and example embodiments of the invention and its teachings.

FIG. 5a shows the results for $|\theta^* - \theta_l|$ and FIG. 5b shows the results for $|\theta_u - \theta^*|$.

DETAILED DESCRIPTION

As described in the Background of the Invention, a software defined receiver is a major change from traditional hardware based receivers that are usually not easily reconfigurable. A software defined receiver is designed to provide multiple functionality while allowing software based reconfiguration. A software approach to designing receivers provides a re-programmable architecture where most or all of the physical layer processing are implemented. The programmable architectures include field programmable gate arrays (FPGA), digital signal processors (DSP), and general purpose processors (GPP). These programmable architectures allow adding new capabilities to a receiver without making any hardware changes. A typical software defined receiver architecture is shown in FIG. 1.

As described in the Summary of the Invention, the teachings of the present invention provide a new hybrid signal detector that quickly and reliably discerns the presence of signals of interest in a spectrum space or frequency band using a hybrid block and truncated sequential energy detection.

In a theoretical setting, a sequential detector continues to take additional samples until a reliable decision is made. That is, the sequential detector terminates if and only if a decision is made. In the present invention, a sequential detector is governed by a termination rule which will be triggered when a decision is not made at the end of a certain number of stages. That is, the termination rule forces the detector to make a decision. The termination rule truncates the number of samples to a finite value. The new sequential detector is referred to as a truncated sequential energy detector (T-SED).

A hybrid signal detector according to the teachings of the present invention has multiple input parameters which can be independently controlled to support various application environments and their performance requirements. The capability to support different performance requirements renders the hybrid detector adaptive to various application environments. Therefore, such an adaptive detector will typically be implemented in a software defined receiver added as a software module within the signal processing block of the receiver.

T-SED is a finite stage detector which at the beginning of each stage scans a frequency band of interest to collect additional samples and attempts to make a decision. The number of stages is denoted by M, M=1, . . . , K, where K denotes the maximum allowable number of stages. At each stage M, T-SED scans a frequency band of interest for a duration $t_s$ to collect L independent and identically distributed samples.

T-SED terminates at any stage after a decision is made in favor of either a signal is not present ($H_0$) or a signal is detected ($H_1$). In the event that a decision cannot be made, T-SED moves to the next stage where it will take an additional block of samples and attempt to make a decision. Thus, T-SED can terminate at any stage. M, therefore, is a random variable with support defined in the range [1-K]. The number of samples collected at the end of stage M is denoted by $N_M$.

$N_M$ is a random variable with support defined in the range $N_M \in [L, KL]$, where $N_M = L$ corresponds to the event when SED terminates at M=1; KL denotes the maximum allowable sample size. When reliable detection cannot be made at the end of stage M=K−1, that is, after (K−1)L samples are collected, T-SED will move to the last stage denoted by K. In the last stage K, T-SED will take an additional L samples before it makes a decision.

Decision Statistics.

At the beginning of each stage M, T-SED scans a frequency band of interest and collects L samples. The estimated energy at each stage M is computed as $$E_M = \frac{1}{2W} \sum_{l=1}^{L} \left| R\left(\frac{l}{2W}\right) \right|^2.$$

The present invention provides a new approach to computing a decision statistic for each stage given by $\Omega_M = E_M - E_{H_0}[E_M]$, that is, $$\Omega_M = \frac{1}{2W} \sum_{l=1}^{L} \left| R\left(\frac{l}{2W}\right) \right|^2 - E_{H_0}\left[ \frac{1}{2W} \sum_{l=1}^{L} \left| R\left(\frac{l}{2W}\right) \right|^2 \right] \quad \text{Eq. (1)}$$

where $E_{H_0}$ is the expectation operator under $H_0$. As the samples are independent and identically distributed at each stage M, $$E_{H_0}\left[ \frac{1}{2W} \sum_{l=1}^{L} \left| R\left(\frac{1}{2W}\right) \right|^2 \right] = L.$$

By introducing $\Omega_M$, the present invention removes the bias (the expected value under $H_0$) from the null hypothesis, and as a result simplifies the problem of discerning the presence of signals in a sequential detection setting.

In the absence of $\Omega_M$, both $\Lambda_M | H_0$ and $\Lambda_M | H_1$ increase monotonically, making detection difficult.

At each stage M, a cumulative decision statistic $\Lambda_M$ is computed using $\Omega_M$ and a decision statistic from the previous stage $\Lambda_{M-1}$, as $\Lambda_M = \Lambda_{M-1} + \Omega_M$. The cumulative decision statistic at the end of stage M is computed as:

$$A_M = \frac{1}{2W} \sum_{l=1}^{N_M} \left| R\left(\frac{l}{2W}\right) \right|^2 - M \times L \quad \text{Eq. (2)}$$

where $N_M = M \times L$ is the sample size at the end of stage M.

Decision Rule.

At the end of each stage M, T-SED tests the hypothesis according to the rule:

$$\Lambda_M \begin{cases} \leq \theta_l & \text{spectrum hole available } (\mathcal{H}_0 \text{ true}) \\ \in (\theta_l, \theta_u) & \text{go to stage } M+1 \\ \geq \theta_u & \text{PU present } (\mathcal{H}_1 \text{ true}) \end{cases} \quad \text{Eq. (3)}$$

where $\theta_l$ and $\theta_u$ denote the lower and upper detection thresholds. The continuation region is defined by $(\theta_l, \theta_u)$, as described in A. Wald, *Sequential Analysis*. It is the region where a reliable decision is not possible. The detection thresholds $\theta_l$ and $\theta_u$ are selected to guarantee desired probabilities of both False Alarm (FA) and Missed Detection (MD).

If T-SED cannot make a reliable decision by the end of stage K−1, it moves to stage K where a decision is enforced after collecting an additional block of samples. During this last stage, T-SED behaves as a conventional block energy detector where a decision is made according to the rule:

$$\Lambda_K \begin{cases} \leq \theta^* & \text{choose } \mathcal{H}_0 \\ > \theta^* & \text{choose } \mathcal{H}_1 \end{cases} \quad \text{Eq. (4)}$$

where $\theta^*$ is a detection threshold and $\theta^* \in [\theta_l, \theta_u]$. The location of $\theta^*$ within the indifference region determines a trade-off between providing interference protection to PUs and maximizing utilization efficiency of available spectrum. To provide effective interference protection to a PU, it is essential to minimize the frequency of MD events, that is, $\theta^*$ is located close to $\theta_l$. On the other hand, to maximize efficiency of spectrum hole utilization, the occurrence of FA events should be significantly low, that is, $\theta^*$ is located close to $\theta_l$. MD events can be significantly reduced at the expense of increased FA events, and vice versa. Thus, the relative placement of $\theta^*$ within $R_I$ provides a measure of trade-off between providing interference protection to PUs and maximizing SU spectrum utilization efficiency.

Prior art approaches are not flexible in selecting a value for $\theta^*$ relative to $\theta_l$ and $\theta_u$. In the present invention, an application dependent parameter is introduced to capture the design tradeoff and place $\theta^*$ according to the required performance. Therefore, the relative location of $\theta^*$ is determined according to:

$$\theta^* = \alpha \theta_l + (1-\alpha) \theta_u \qquad \text{Eq. (5)}$$

where $\alpha$, $\alpha \in [0, 1]$ denotes the trade-off parameter. The value of $\alpha$ is set according to the desired performance and the application environment. For example, when $\alpha = \frac{1}{2}$, $\theta^*$ will be equidistant from the upper and lower thresholds. Consequently, by setting $a = \frac{1}{2}$, T-SED can be designed to be unbiased toward minimizing either MD or FA events. In general, for $0 \leq \alpha < \frac{1}{2}$, the frequency of false alarm (FA) events may be reduced, maximizing spectrum utilization efficiency. Therefore, when $\alpha \in (0, \frac{1}{2})$, T-SED is biased toward reducing frequency of FA events, thereby improving utilization efficiency of spectrum holes. On the other hand, for $\frac{1}{2} < \alpha \leq 1$, T-SED is biased toward providing interference protection to a PU by minimizing the frequency of miss detection events.

Figure 2:
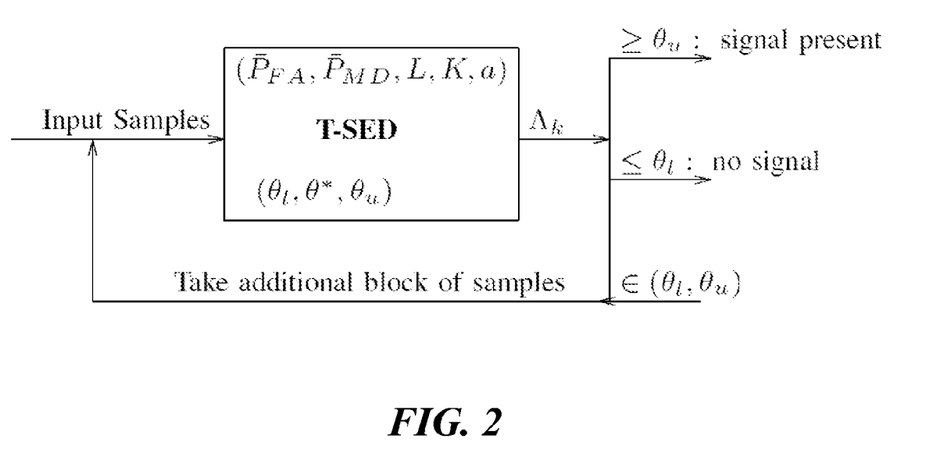
FIG. 2 is a block diagram of the T-SED algorithm component of the teachings of the present invention.
Figure 8:
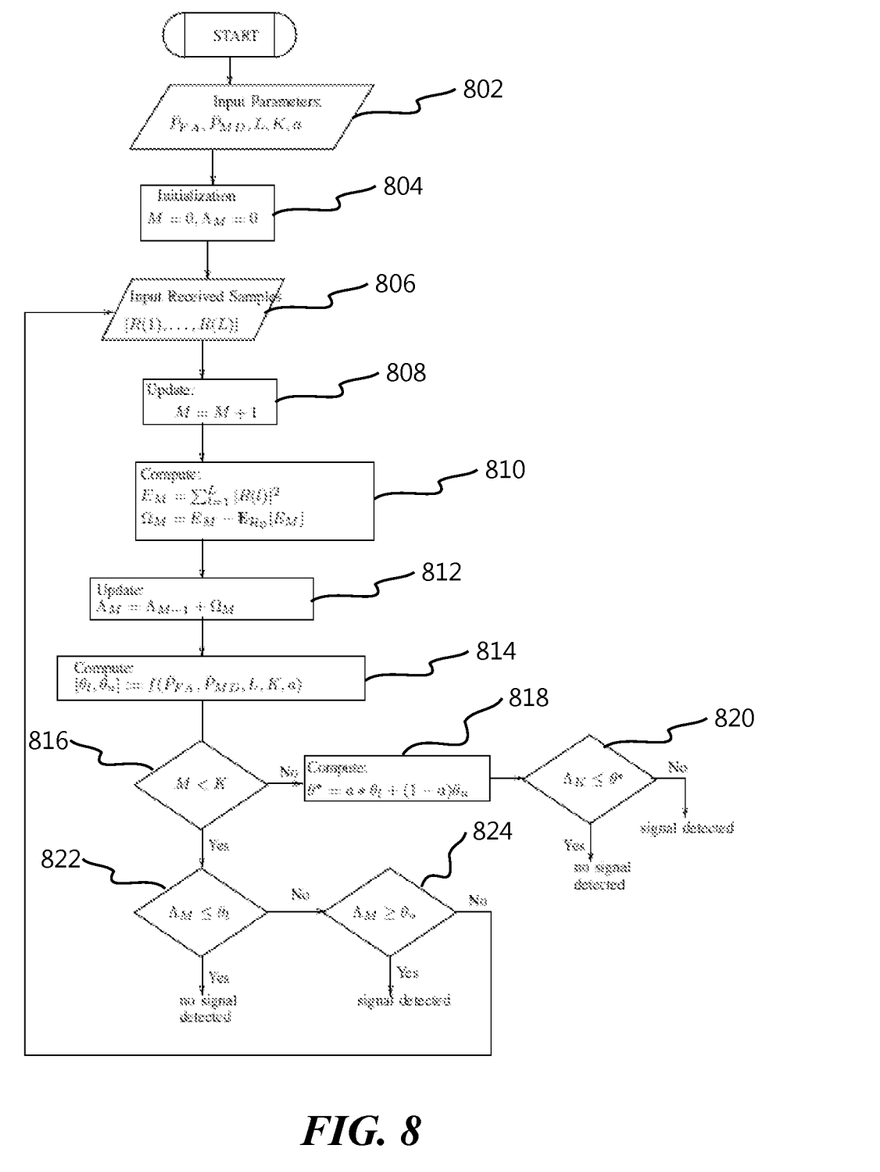
FIG. 8 is a flow chart representation of an example software implementation of a hybrid signal detector made according to the teachings of the present invention.

FIG. 2 is a block diagram of the T-SED algorithm component of the teachings of the present invention showing operation of the algorithm before application of the termination rule show in decision block 802 of FIG. 8.

Performance of the hybrid detector is measured using achievable false alarm and miss detection probabilities, and average detection delay is used as an additional metric for measuring achievable performance. As sample size is a random variable, achievable average detection delay provides a good measure to gauge performance of the hybrid detector.

False Alarm Probability.

As described earlier, a False Alarm (FA) corresponds to an event where the hybrid detector wrongly declares signal of interest is present, which consequently labels a spectrum hole as unavailable. The occurrence of FA events limit access to available spectrum incurring denial of service (DoS) to secondary users of the spectrum. This degrades the spectrum utilization efficiency which affects achievable throughput. FA probability of the hybrid detector, denoted by $P_{FA}$, is given by, $$P_{FA} = P\left(\bigcup_{i=1}^{K} FA_i\right), \qquad \text{Eq. (6a)}$$

where $$FA_i \triangleq \begin{cases} \Lambda_i \geq \theta_u \,|\, \theta_l < \Lambda_{i-1} < \theta_u, \mathcal{H}_0; i = 1, \ldots, K-1 \\ \Lambda_i > \theta^* \,|\, \theta_l < \Lambda_{i-1} < \theta_u, \mathcal{H}_0; i = K \end{cases} \qquad \text{(6b)}$$

Missed Detection Probability.

Also as described earlier, a Missed Detection (MD) defines an event where T-SED fails to discern the presence of a PU in a frequency range of interest. When an MD event is triggered, a spectrum of interest is wrongly declared available for opportunistic access. As a result, SUs begin accessing channels that are being used by PUs, incurring interference. Frequent MD events may subject the incumbent system (PU) to co-channel interference which may degrade PU performance. The impact of MD events on incumbent systems depends on the system under consideration. In a spectrum sharing environment, incumbent systems may be designed to tolerate some level of interference from DSA systems. That is, PU and SU can coexist spectrally as long as SU does not generate harmful interference. Therefore, in such an environment, T-SED may be designed to minimize occurrence of MD events. The MD probability, denoted by $P_{MD}$, is given by, $$P_{MD} = P\left(\bigcup_{i=1}^{K} MD_i\right) \qquad \text{Eq. (7a)}$$

where, $$MD_i \triangleq \begin{cases} \Lambda_i \leq \theta_l \,|\, \theta_l < \Lambda_{i-1} < \theta_u, \mathcal{H}_1; i = 1, \ldots, K-1 \\ \Lambda_i \leq \theta^* \,|\, \theta_l < \Lambda_{i-1} < \theta_u, \mathcal{H}_1; i = K \end{cases} \qquad \text{Eq. (7b)}$$

As can be seen from Eqs. (6) and (7), it is cumbersome to derive closed-form expressions for the error probabilities as K-fold integrals are involved. In particular, $P(\Lambda_M | H_1)$ involves the normalized lower gamma function, making it mathematically intractable to obtain closed-form expression for $P_{MD}$. Furthermore, the tedious effort will result in a computationally inefficient T-SED design. Therefore, in another example embodiment, the present invention provides an approach allowing obtaining detection error bounds for T-SED.

In order to derive the error bounds, stages $1, \ldots, K-1$ are treated as belonging to a non-truncated SED, while the last stage belongs to a block detector. SED gets activated at the first stage and can remain active until the $K-1^{th}$ stage, while the block detector gets activated when SED provides no reliable decision by the end of stage $K-1$. The decision rule for the first $K-1$ stages is as defined in Eq. (3), while the decision rule at the last stage is defined in Eq. (4). Thus, occurrence of an error event at any one of stages M, $M=1, \ldots, K-1$, are attributed to the SED part of T-SED, while error events that occur at the $K^{th}$ stage are attributed to the block detector part.

Therefore, the error probability of the hybrid detector can be defined as a weighted sum of error probabilities of SED and BD. In the present invention, the weights are determined by the probabilities of events ($M \leq K-1$) and ($M = K$), respectively. That is, $$P_{MD} = P(M \leq K-1 | \mathcal{H}_1) P_{MD,SED} + P(M = K | \mathcal{H}_1) P_{MD,BD}$$

$$P_{FA} = P(M \leq K-1 | \mathcal{H}_0) P_{FA,SED} + P(M = K | \mathcal{H}_0) P_{FA,BD} \qquad \text{Eq. (8)}$$

where $P_{FA,SED}$ and $P_{MD,SED}$ denote FA and MD probabilities of SED; $P_{FA,BD}$ and $P_{MD,BD}$ denote FA and MD probabilities of BD. Before obtaining error bounds for T-SED, first error bounds for $P_{FA,SED}$ and $P_{MD,SED}$ are obtained based on error bounds of the sequentially probability ratio test (SPRT), making use of the Wald-Wolfwitz theorem.

The Wald-Wolfwitz theorem states that the error rate of sequentially probability ratio test is an upper bound of the error rate of any other sequential detector. It is important to recognize that SED is a sequential test that does not involve likelihood ratio computation. On the other hand, SPRT is a sequential likelihood ratio test. Thus, the error probability of SED is upper bounded by error probabilities of SPRT. According to the Wald-Wolfwitz theorem, the upper bound of $P_{FA,SED}$ and $P_{MD,SED}$ is given by:

$$P_{FA,SED} \leq P_{FA,SPRT}$$

$$P_{MD,SED} \leq P_{MD,SPRT} \qquad \text{Eq. (9)}$$

where $P_{FA,SPRT}$ and $P_{MD,SPRT}$ denote FA and MD probabilities of SPRT. The relationship between detection thresholds and (($P_{FA,SPRT}$ and $P_{MD,SPRT}$)) is given in earlier referenced A. Wald, *Sequential Analysis*. Using the Wald-Wolfwitz theorem, the relationship between detection thresholds and error probabilities of SED can be approximated as:

$$P_{FA,SED} \approx \frac{1-\theta_1}{\theta_u - \theta_1} \qquad \text{Eq. (10a)}$$

$$P_{MD,SED} \approx \theta_1 \frac{\theta_u - 1}{\theta_u - \theta_1} \qquad \text{Eq. (10b)}$$

Expressions for $P_{FA,BD}$ and $P_{MD,BD}$ are next obtained.

It is practical to consider that a sufficiently large number of samples are collected by the end of the last stage. Based on this, the central limit theorem can be invoked to approximate the probability distribution of $\Lambda_K$ under $H_0$ and $H_1$ with Gaussian distribution. It can be shown that $\Lambda_K|H_0 \sim N(0, 2K \times L)$ and $\Lambda_K|H_1 \sim N(K \times L\bar{\gamma}; (2+\bar{\bar{\gamma}})K \times L)$, where $\bar{\gamma}$ denotes average signal-to-noise ratio (SNR), and $\bar{\bar{\gamma}}$ denotes variance of the SNR. Both $\bar{\gamma}$ and $\bar{\bar{\gamma}}$ depend on the underlying wireless channel characteristics. For example, for a random signal with Rayleigh amplitude, $\bar{\bar{\gamma}} = \bar{\gamma}^2$. It can be shown that $P_{FA,BD}$ and $P_{MD,BD}$ are given by:

$$P_{FA,BD} = \frac{1}{2}\left(1 - erf\left(\frac{\theta^*}{2\sqrt{K \times L}}\right)\right) \qquad \text{Eq. (11a)}$$

$$P_{MD,BD} = \frac{1}{2}\left(1 + erf\left(\frac{\theta^* - K \times L_{\bar{\gamma}}}{\sqrt{2K(2+\bar{\bar{\gamma}})L}}\right)\right) \qquad \text{Eq. (11b)}$$

where $erf(z)$ is the error function defined as $$erf(z) = \frac{2}{\sqrt{\pi}} \int_0^z e^{-x^2} dx.$$

As shown in Eq. (8), probability distributions of M under $H_0$ and $H_1$ are required to obtain the error bounds. In the prior art, the expected value of M has significant importance because it defines the average detection delay; therefore, there is less focus to characterize the distribution of M. In the present invention, the probability distribution of M is characterized as it is required to define the error bounds as shown in Eq. (8). As a first step toward defining the probability distribution of M, the following observation regarding the expected value of M, denoted by E[M] is made. The expected value of M is a function of the noise power under both $H_0$ and $H_1$. The effect of noise power on $E_{H0}[M]$ and $E_{H1}[M]$ intuitively can be summarized as:

When noise power is low, average detection delay is relatively longer which means $E_{H0}[M]$ is relatively larger. On the other hand, when noise power is higher, expected sample size ($E_{H0}[M]$) is smaller. Thus, $$E_{H0}[M] \propto \frac{1}{\sigma_n^2}.$$

When noise power is low, average detection delay is relatively shorter under $H_1$ meaning $E_{H1}[M]$ is relatively smaller. On the other hand, when noise power is higher, expected sample size ($E_{H1}[M]$) will be relatively larger. That is, $E_{H1}[M] \propto \sigma_n^2$.

Therefore, the probability distribution of M is defined using noise variance as a parameter. Since M is a discrete random variable, the discrete distribution of M can be approximated using a Gaussian distribution sampled at discrete values of M where M=[1, K]. That is, $$P(X = M) = \frac{f_X(x)\delta(x - M)}{\sum_{M=1}^{K} f_X(x)\delta(x - M)} \qquad \text{Eq. (12)}$$

Where $$f_X(x) = \frac{1}{\sqrt{2\pi\sigma^2}} e^{-\frac{x^2}{2\sigma^2}}; \sigma^2\Big|\mathcal{H}_0 = \frac{1}{\sigma_n^2}, \sigma^2\Big|\mathcal{H}_1 = \sigma_n^2; \delta(x)$$

is the Dirac delta function.

The error probabilities of a detector according to the teachings of the present invention are then given by:

$$P_{FA} = \qquad \text{Eq. (13a)}$$
$$P(M < K)\frac{1-\theta_1}{\theta_u - \theta_1} + P(M = K)\frac{1}{2}\left(1 - erf\left(\frac{a\theta_1 + (1-a)\theta_u}{2\sqrt{K \times L}}\right)\right)$$

$$P_{MD} = P(M < K)\theta_1 \frac{\theta_u - 1}{\theta_u - \theta_1} + \qquad \text{Eq. (13b)}$$
$$P(M = K)\frac{1}{2}\left(1 + erf\left(\frac{a\theta_1 + (1-a)\theta_u - K \times L_{\bar{\gamma}}}{\sqrt{2K(2+\bar{\bar{\gamma}})L}}\right)\right)$$

Note that $\theta^*$ is substituted with Eq. (5). It can be observed from Eqs. (13a) and (13b) that the error probabilities are a function of trade-off parameter $\alpha$ which determines the detection error bias at the last stage of T-SED. For required FA and MD probabilities, detection thresholds will be obtained by jointly solving Eqs. (13a) and (13b) using numerical methods which converge quickly.

The input design parameters of the present invention are:
Target FA and MD probabilities $\bar{P}_{FA}$ and $\bar{P}_{MD}$.
sample block size for each sampling stage: L
maximum number of decision stages: K
trade-off parameter: $\alpha$ In accordance with another embodiment, the present invention selects detection thresholds $\theta_l$ and $\theta_u$ based on desired target FA and MD probabilities ($\bar{P}_{FA}$ and $\bar{P}_{MD}$); sample block size (L), maximum number of stages (K) and trade-off parameter ($\alpha$). Prior art approaches are not robust in that $\theta_l$ and $\theta_u$ are not selected to satisfy desired error performance.

Implementation.

As noted earlier, a software defined radio architecture enables design of programmable receivers that provide multiple functionality. The present invention exploits the programmable architecture of software defined receivers to provide a re-configurable and multimode signal detection capability. The hybrid signal detector is reconfigurable and multimode in the sense of providing various levels of performance by tuning the various input parameters. Indeed, the various performance levels correspond to various application environments. For example, in a spectrum sharing environment where SUs coexist with PUs, it is desirable to provide interference protection to PUs by limiting the number of MD events. In other words, in such an environment, it is desirable to keep $P_{MD}$ very low.

Figure 3:
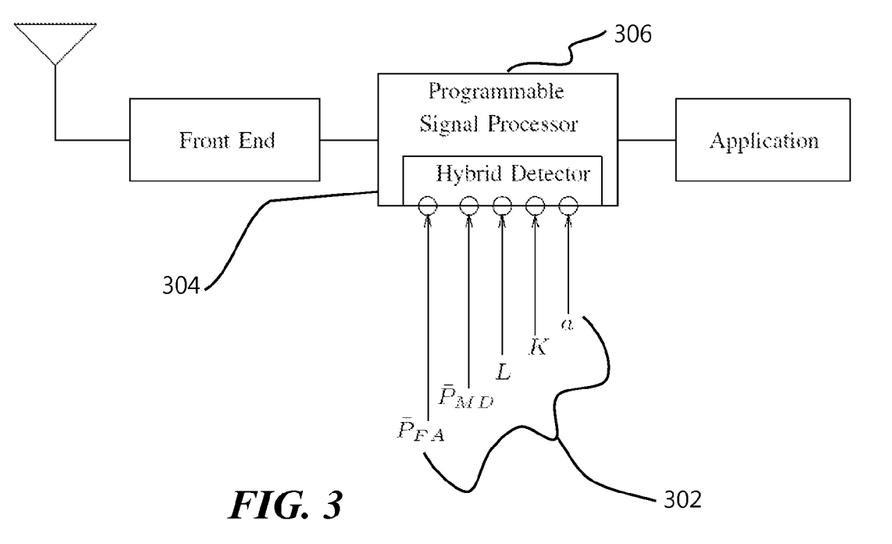
FIG. 3 is a block diagram of an example embodiment of a hybrid signal detector according to the teachings of the present invention.

FIG. 3 shows an example embodiment of an implementation architecture for an adaptive hybrid detector made according to the teachings of the present invention showing the parameters inputs 302 to a hybrid detector 304 implemented as part of a programmable signal processor 306.

Performance.

Performance of a hybrid detector made according to the teachings of the present invention, as a function of applicable input parameters, can be demonstrated. In order to gauge the impact of an input parameter, individual input parameters can be varied while keeping other parameters fixed. Because the goal is attaining quick and reliable detection, average detection is used as a metric to gauge performance.

System Model.

Consider a DSA system where SUs conduct spectrum sensing to determine the presence of a signal of interest, thereby determining the presence of spectrum holes. Assume that SUs are half-duplex radios which limit their ability to sense and transmit over the same frequency simultaneously. Assume also that SUs have no prior information about signal structure of primary users (PUs). Therefore, to evaluate performance of the hybrid detector, any PU signals are characterized by random amplitude.

The presence or absence of a PU signal can be formulated as a binary hypothesis problem where a null hypothesis ($H_0$, PU absent) is tested against an alternative hypothesis ($H_1$, PU signal present). The hypothesis is defined as:

$$r(t) = \begin{cases} n(t), & \mathcal{H}_0 \\ As(t) + n(t), & \mathcal{H}_1 \end{cases} \quad \text{Eq. (14)}$$

where n(t) denotes additive white Gaussian noise with one-sided PSD denoted by $N_0$; s(t) denotes the normalized received PU signal envelope with random amplitude A. The random signal amplitude is valid in the sense that SUs have no prior information about the signal structure of PU signals. Here we assume that the signal amplitude A is characterized by a Rayleigh distribution.

Figure 4:
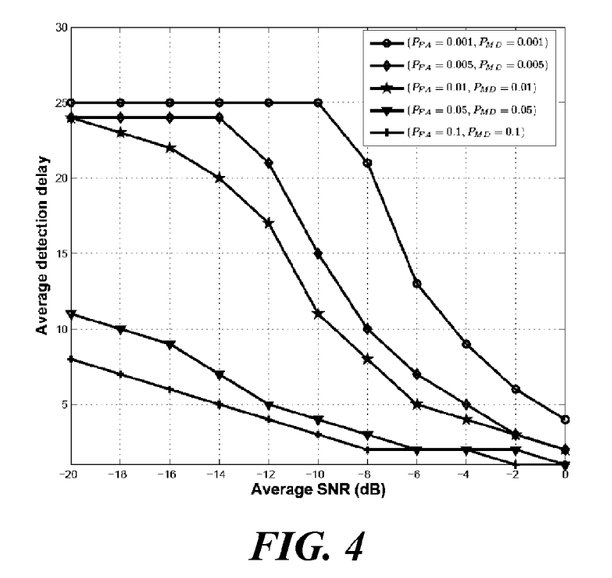
FIG. 4 is a graph of the average detection delay as a function of signal to noise ratio (SNR) for various values of $P_{FA}$ and $P_{MD}$ in an example embodiment of a hybrid signal detector according to the teachings of the present invention.

The received signal r(t) will pass through a pre-filter to limit the noise power. The frequency response is:

$$H(f - f_c) = \begin{cases} \dfrac{2}{\sqrt{N_0}}, & |f| \leq W/2 \\ 0, & |f - f_c| > W/2 \end{cases} \quad \text{Eq. (15)}$$

where W denotes bandwidth of the received signal and $f_c$ denotes carrier frequency of the PU. Output of the pre-filter, denoted by R(t), is input to the energy detector which comprises a squaring device and an integrator. First, consider performance of the hybrid detector as a function of average signal-to-noise (SNR) ratio for various values of $\overline{P}_{FA}$ and $\overline{P}_{MD}$. Note that L, K and α are set to fixed values. It can be observed from FIG. 4 that at low SNR the average detection delay is significant, particularly at lower values of $P_{FA}$ and $P_{MD}$. As shown in FIG. 4, the expected detection delay decreases as SNR increases. The other input parameters in FIG. 4 are α=½, L=100 and K=25.

Examining the behavior of the hybrid detector at the last stage as a function of $P_{MD}$ for various values of the trade-off parameter α, the behavior at the last stage is characterized by a bias dictated by a performance requirement. Using distances $|\theta^*-\theta_l|$ and $|\theta_u-\theta^*|$ to measure bias of the detector at the last stage of the truncated sequential detection process, the results are as shown in FIGS. 5a and 5b, where $P_{FA}=P_{MC}$, L=100 and K=50.

Figure 5A:
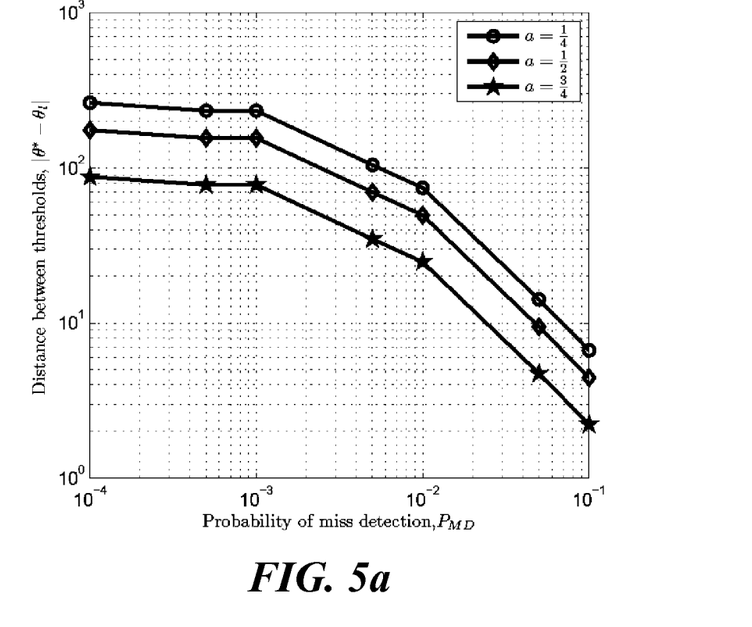
FIGS. 5a and 5b are graphs showing the bias of an example embodiment of a hybrid signal detector according to the teachings of the present invention using distance between $\theta^*$ and the two thresholds as a function of $P_{MD}$ for various values of $\alpha$ at SNR=−20 dB.
Figure 5B:
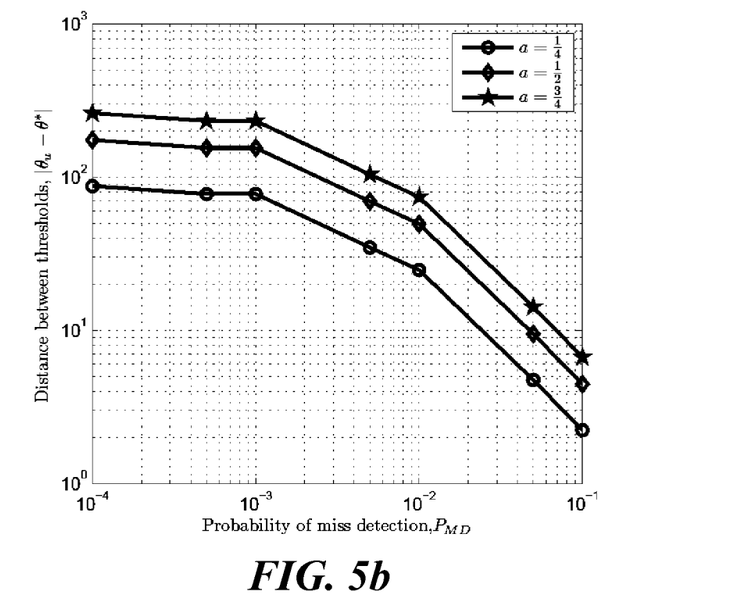

As seen from FIGS. 5a and 5b, the location of $\theta^*$ changes with a while holding $P_{MD}$ fixed. For example, at $P_{MD}=10^{-3}$, $|\theta^*-\theta_l|>|\theta_u-\theta^*|$ when α=¾. This shows that selecting α=¾, yields a relatively narrow acceptance region which has the effect of reducing the frequency of missed detection events. On the other hand, when α=¼, $|\theta^*-\theta_l|>|\theta_u-\theta^*|$ at $P_{MD}$, the critical region is relatively narrower which effectively means the hybrid detector is biased toward reducing the frequency of false alarm events. When α=½, $|\theta^*-\theta_l|=|\theta_u-\theta^*|$, that is, the hybrid detector is unbiased in terms of reducing either of the error events. Reducing MD events is attained at the risk of increased FA events, and vice versa. In a spectrum sharing environment, minimizing MD events is tantamount to providing enhanced protection to the incumbent user of the spectrum. On the other hand, minimizing FA events increases utilization efficiency of spectrum holes.

Figure 6:
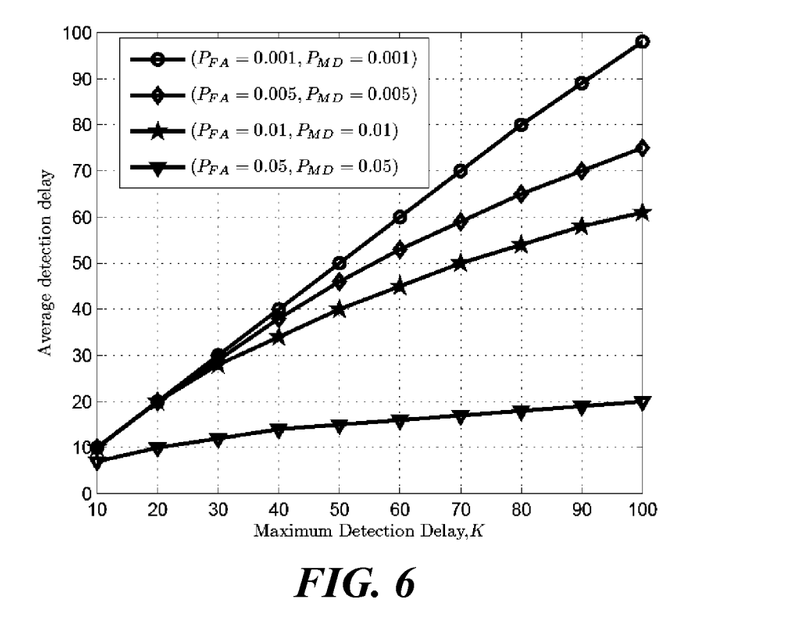
FIG. 6 is a graph showing average detection delay, for an example embodiment of a hybrid signal detector according to the teachings of the present invention, as a function of maximum detection delay K for various values of $P_{FA}$ and $P_{MD}$ at SNR=−20 dB.

Performance of the detector is evaluated using various values for the maximum number of stages K. In particular, the truncation point is varied to measure the achievable average detection delay for various error performance requirements, namely, $P_{FA}$ and $P_{MD}$. FIG. 6 shows plots of achievable detection delay as a function of the maximum delay at SNR=−20 dB. The other input parameters are α=½ and L=100. There is a linear relationship between average detection delay and the maximum delay when significantly low detection error is required, for example $P_{FA}=0.001$ and $P_{MD}=0.001$. As the error performance requirement is relaxed, the achievable average detection delay becomes lower than the maximum delay. For example, at $P_{FA}=0.005$, $P_{MD}=0.005$, the linear relationship vanishes beyond K=40 which indicates that average detection below the maximum can be achieved.

As the expected error performance is further relaxed, it is possible to achieve average detection delay well below the maximum detection delay (see, for example, the plot labeled $P_{FA}=0.05$, $P_{MD}=0.05$).

Figure 7:
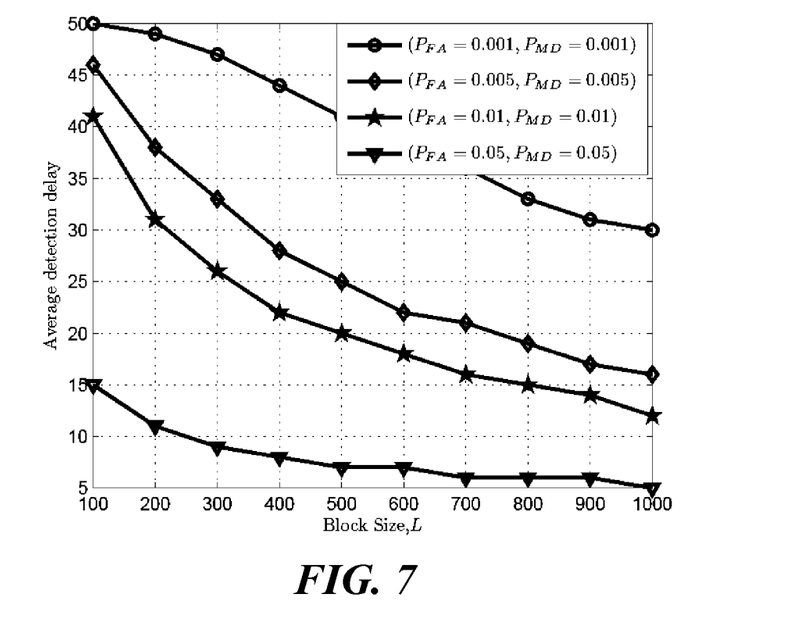
FIG. 7 is a graph of average detection delay, for an example embodiment of a hybrid signal detector according to the teachings of the present invention, as a function of sample size L for various values of $P_{FA}$ and $P_{MD}$ at SNR=−20 dB.

Finally, the effect of per stage sample size (L) on performance of the hybrid detector is examined. Intuitively, when L is significantly large, the hybrid detector may terminate quickly; that is, as L increases, the average detection delay is reduced. This can be observed from the FIG. 7 graph of average detection delay, for an example embodiment of a hybrid signal detector according to the teachings of the present invention, as a function of sample size L for various values of $P_{FA}$ and $P_{MD}$ at SNR=−20 dB. The other input parameters are α=½ and K=50.

FIG. 8 is a more detailed flow chart representation of the adaptability of the present invention by the use of input parameters to determine values for thresholds $\theta_l$ and $\theta_u$ for different performance requirements, such as favoring False Alarms over Missed Detections when avoiding interference with a Primary User is more important than missed opportunities at spectrum access.

Block 802 shows the input of parameters $\overline{P}_{FA}$, $\overline{P}_{MD}$, L, K and α; block 804 initialization of the algorithm with M=Ø and with the value of initial cumulative decision statistic $\Lambda_M$ also set to Ø; block 806 shows inputting received samples R(1), ..., R(L) as part of a block energy detection process; block 808 shows updating the value of M after receiving a set of samples; block 810 shows the computation of estimated energy $E_M$ and decision statistic $\Omega_M$ from the received samples; and block 812 shows the value of the cumulative decision statistic $\Lambda_M$ updated as $\Lambda_M-1+\Omega_M$.

Block 814 shows thresholds $\theta_l$ and $\theta_u$ selected as a function of input parameters $\overline{P}_{FA}$, $\overline{P}_{MD}$, L, K and α. The function $f(\overline{P}_{FA}, \overline{P}_{MD}, L, K, \alpha)$ is not expressly defined because it does not have a closed form solution and is computed using a fast converging and efficient numerical method, such as a trust-region algorithm, to jointly solve Eqs. (13a) and (13b). In particular, trust-region dogleg implementation is used to show achievable performance of the present invention.

Decision block 814 shows application of a sequential truncation rule providing a branch to a block 818 computation of a final threshold value θ*, and application in decision block 820 of the yes-no final decision of the T-SED algorithm show in Eq. (4).

Decision blocks 822 and 824 apply the yes-no-undecided rule show in Eq. (3) with an undecided decision returning to inputting received samples 802 or the beginning of a next sequential block detection process.

As described in the Summary of the Invention, the new hybrid block and truncated sequential energy detector is not a mere combining, or adding together, block and truncated sequential energy detectors, but an interoperating of the two prior art approaches resulting in a truly synergistic more than the sum of its parts result.

Those having skill in the art of the invention will understand that limitations in the claims such as greater than or equal to a first value and lesser than a second value are indistinct from greater than the first value and less than or equal to the second value, and are described as such in the claims only for clarity and not as limitations extending beyond distinguishing from prior art teachings.

Various other modifications to the invention as described may be made, as might occur to one with skill in the art of the invention, within the scope of the claims. Therefore, not all contemplated example embodiments have been shown in complete detail. Other embodiments may be developed without departing from the spirit of the invention or from the scope of the claims.

We claim:

1. An adaptive signal detector to detect a signal in a spectrum space, including:
   a software defined receiver, the software defined receiver for calculating a cumulative decision statistic for determining a presence of the signal in the spectrum space;
   the cumulative decision statistic being determined by a sequential energy detector that interoperates:
     a block energy detector having a block termination rule, a block sampling instant and a block decision phase; and,
     a truncated sequential energy detector having a truncated sequential termination rule and a truncated sequential decision phase;
     the block energy detector and truncated sequential energy detector therein interoperated to provide the cumulative decision statistic in which the block energy sampling instants provide samples that are independent and identically distributed; and,
     the cumulative decision statistic determining the presence of the signal in the spectrum space based upon a non-Bayesian dynamic mathematical modeled relationship of the cumulative decision statistic.

2. The adaptive signal detector of claim 1 wherein the block decision phase is calculated as:
   if the cumulative decision statistic is less than or equal to a lower detection threshold value, then a signal is not detected; and,
   if the cumulative decision statistic is greater than or equal to an upper detection threshold value, then a signal is detected.

3. The adaptive signal detector of claim 1 wherein the truncated sequential decision phase is calculated by:
   if the cumulative decision statistic is less than or equal to a last stage detection threshold value, then a signal is not detected and,
   if the cumulative decision statistic is greater than the last stage detection threshold value, then a signal is detected.

4. The adaptive signal detector of claim 1, further including a programmable signal processor programmed, for a plurality M of block energy detection stages, for M=1 to K, wherein K equals a user-definable allowable number of stages to:
   (a) receive a block of multiple samples distributed along the frequency band;
   (b) compute a cumulative decision statistic by calculating an estimated energy in the frequency band as the estimated energy over all samples collected throughout all previous stages and a current stage M;
   (c) if the cumulative decision statistic is less than or equal to a lower detection threshold value, then output a first signal that is not in the frequency band and stop;
   (d) if the cumulative decision statistic is greater than or equal to an upper detection threshold value, then output a second signal that is in the frequency band and stop;
   (e) if the cumulative decision is between the lower and upper detection threshold values, then repeat (a) through (d) for M+1; and,
   (f) if M=K, then repeat (a) through (b) and go to (g);
   (g) if the cumulative decision statistic is less than or equal to a last stage detection threshold value, then output the first signal that is not in the frequency band and stop; and,
   (h) if the cumulative decision statistic is greater than the last stage detection threshold value, then output the second signal that is in the frequency band and stop.

5. The hybrid signal detector according to claim 4, wherein the cumulative decision statistic is calculated as the estimated energy in the frequency band as the estimated energy over all samples collected throughout all stages, less a total number of samples collected throughout all stages.

6. The hybrid signal detector according to claim 4, wherein the cumulative decision statistic is calculated as:

$$\frac{1}{2W} \sum_{l=1}^{N_M} \left| R\left(\frac{l}{2W}\right) \right|^2 - M \times L,$$

where W is a value of the bandwidth of a received signal, M is an integer value of the just completed sequential stage, L is a number of independent samples collected at stage M, $N_M$ is M×L, a total sample size at an end of stage M, and R is an amplitude of the received signal.

7. The hybrid signal detector according to claim 4, wherein the lower and upper detection thresholds are calculated to achieve target false alarm and missed detection probabilities $\overline{P}_{FA}$ and $\overline{P}_{MD}$, respectively, by jointly solving:

$$P_{FA} = P(M < K)\frac{1-\theta_l}{\theta_u - \theta_l} + P(M = K)\frac{1}{2}\left(1 - erf\left(\frac{a\theta_l + (1-a)\theta_u}{2\sqrt{K \times L}}\right)\right);$$

and, $$P_{MD} = P(M < K)\theta_l\frac{\theta_u - 1}{\theta_u - \theta_l} + P(M = K)\frac{1}{2}\left(1 + erf\left(\frac{a\theta_l + (1-a)\theta_u - K \times L_\gamma}{\sqrt{2K(2+\overline{\gamma})L}}\right)\right),$$

where $\theta_l$ is a value of the lower threshold, $\theta_u$ a value of the upper threshold, L a sample block size for each sampling stage M, K a maximum number of stages, and $\alpha$ is a tradeoff parameter for a final stage threshold $\theta^*$, where $\theta^* = \alpha\theta_l + (1-\alpha)\theta_u$.

* * * * *